US009467271B2

(12) United States Patent
Nagata et al.

(10) Patent No.: US 9,467,271 B2
(45) Date of Patent: Oct. 11, 2016

(54) RADIO BASE STATION APPARATUS, MOBILE TERMINAL APPARATUS AND RADIO COMMUNICATION SYSTEM

(71) Applicant: NTT DOCOMO, INC., Tokyo (JP)

(72) Inventors: Satoshi Nagata, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/935,170

(22) Filed: Nov. 6, 2015

(65) Prior Publication Data
US 2016/0142195 A1 May 19, 2016

Related U.S. Application Data

(63) Continuation of application No. 13/977,751, filed as application No. PCT/JP2011/078580 on Dec. 9, 2011, now abandoned.

(30) Foreign Application Priority Data

Jan. 6, 2011 (JP) .................................. 2011-001419

(51) Int. Cl.
*H04Q 7/00* (2006.01)
*H04L 5/00* (2006.01)
*H04J 11/00* (2006.01)
*H04W 24/00* (2009.01)
*H04W 72/04* (2009.01)
(Continued)

(52) U.S. Cl.
CPC ........... *H04L 5/0073* (2013.01); *H04B 17/309* (2015.01); *H04B 17/382* (2015.01); *H04J 11/005* (2013.01); *H04L 5/0048* (2013.01);
(Continued)

(58) Field of Classification Search
None
See application file for complete search history.

(56) References Cited

U.S. PATENT DOCUMENTS 8,086,230 B2 12/2011 Iwamura
8,923,203 B2 * 12/2014 Fong .................... H04J 11/0053
370/252

(Continued)

FOREIGN PATENT DOCUMENTS

| JP | 2009-147920 A | 7/2009 |
| WO | 2010/106729 A1 | 9/2010 |
| WO | 2010/146781 A1 | 12/2010 |

OTHER PUBLICATIONS

Ericsson, et al., "Physical layer parameters to be configured by RRC," 3GPP TSG-RAN WG2 #72, Tdoc R2-106465; Jacksonville, USA; Nov. 15-19, 2010 (18 pages).

(Continued)

*Primary Examiner* — Duc C Ho
(74) *Attorney, Agent, or Firm* — Osha Liang LLP

(57) ABSTRACT

Provided are a radio base station apparatus, a mobile terminal apparatus and a radio communication method capable of taking other-cell interference mitigation measures even in consideration of inter-cell coordination like CoMP. The radio communication method according to the present invention is characterized by, in a radio base station apparatus, generating notification information including subframe information of a serving cell and subframe information of another cell; and transmitting the notification information to a mobile terminal apparatus connected to the serving cell as a connected cell; and in the mobile terminal apparatus, receiving the notification information including the subframe information of the connected cell and the subframe information of another cell; and measuring channel quality of the connected cell with use of the subframe information of the connected cell and measuring channel quality of another cell with use of the subframe information of another cell.

9 Claims, 11 Drawing Sheets

(51) Int. Cl.
  *H04B 17/309* (2015.01)
  *H04B 17/382* (2015.01)
  *H04W 24/02* (2009.01)
  *H04W 52/24* (2009.01)
  *H04W 72/08* (2009.01)

(52) U.S. Cl.
  CPC .......... *H04L 5/0057* (2013.01); *H04L 5/0091* (2013.01); *H04W 24/00* (2013.01); *H04W 24/02* (2013.01); *H04W 52/243* (2013.01); *H04W 72/0446* (2013.01); *H04W 72/082* (2013.01)

(56) References Cited

U.S. PATENT DOCUMENTS

| | | | |
|---|---|---|---|
| 2010/0106610 A1 | 4/2010 | Kraft et al. | |
| 2011/0228825 A1* | 9/2011 | Hirata | H04L 1/0003 375/219 |
| 2011/0317581 A1 | 12/2011 | Hoshino et al. | |
| 2012/0106374 A1* | 5/2012 | Gaal | H04L 5/0048 370/252 |
| 2012/0106610 A1 | 5/2012 | Nogami et al. | |
| 2012/0113844 A1 | 5/2012 | Krishnamurthy | |
| 2012/0120903 A1 | 5/2012 | Kim et al. | |
| 2012/0220327 A1 | 8/2012 | Lee et al. | |
| 2014/0286184 A1* | 9/2014 | Kim | H04B 7/024 370/252 |

OTHER PUBLICATIONS

NTT DOCOMO, "Views on PDSCH Muting," 3GPP TSG RAN WG1 Meeting #62; R1-104932; Madrid, Spain; Aug. 23-27, 2010 (6 pages).

3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

International Search Report issued in PCT/JP2011/078580, dated Feb. 28, 2012 (1 page).

Office Action issued in corresponding Japanese Application No. 2011-001419, mailed Jul. 30, 2013 (5 pages).

Decision of Final Rejection issued in counterpart Japanese application No. 2011-001419 mailed Mar. 18, 2014 (4 pages).

Office Action issued in corresponding Japanese application No. 2014-106955, mailed Jan. 6, 2015 (5 pages).

Huawei; "Email discussion summary of CSI-RS design"; 3GPP TSG RAN WG1 Meeting #61, R1-103100; Montreal, Canada; May 10-14, 2010 (15 pages).

Y. Ohwatari et al.; "Investigation on Improvement of Channel Estimation Accuracy with Data Signal Muting for Downlink Coordinated Multiple-Point Transmission and Reception in LTE-Advanced"; vol. 110, No. 251 IEICE Technical Report, The Institute of Electronics; Oct. 20, 2010 (6 pages).

Decision to Grant a Patent in corresponding Japanese Application No. 2014-106955, dated Mar. 31, 2015 (4 pages).

ETSI TS 136 331 (3GPP TS 36.331) V9.4.0, "LTE; Evolved Universal Terrestrial Radio Access (E-UTRA); Radio Resource Control (RRC); Protocol Specification (Release 9);" Oct. 2010 (255 pages).

Office Action issued in corresponding Chinese Application No. 201180064446.5, mailed Mar. 2, 2016 (6 pages).

Office Action issued in corresponding Korean Application No. 10-2013-7018089, mailed Mar. 18, 2016 (4 pages).

NTT DOCOMO; "Remaining Issue for CSI-RS Signaling"; 3GPP TSG RAN WG1 Meeting #63, R1-106176; Jacksonville, USA; Nov. 15-19, 2010 (10 pages).

* cited by examiner

RADIO BASE STATION APPARATUS, MOBILE TERMINAL APPARATUS AND RADIO COMMUNICATION SYSTEM

CROSS-REFERENCE TO RELATED APPLICATIONS

This application is a continuation application of U.S. patent application Ser. No. 13/977,751 filed Jul. 1, 2013. Accordingly, this application claims benefit of U.S. patent application Ser. No. 13/977,751 under 35 U.S.C. §120. U.S. patent application Ser. No. 13/977,751 is hereby incorporated by reference in its entirety. The disclosure of Japanese Patent Application No. 2011-001419, filed on Jan. 6, 2011, including the specification, drawings, and abstract, is incorporated herein by reference in its entirety.

TECHNICAL FIELD

The present invention relates to a radio base station apparatus, a mobile terminal apparatus and a radio communication method in a next-generation mobile communication system.

BACKGROUND

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, Non-Patent Literature 1).

In a third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). Accordingly, in the future, it is expected that these multiple mobile communication systems will coexist, and configurations (radio base station apparatus, mobile terminal apparatus, etc.) that are capable of supporting these multiple systems will become necessary.

In the downlink of the LTE-A system, it has been decided to use a cell-common CSI-RS (Channel State Information-Reference Signal) for channel quality measurement. This CSI-RS is multiplexed at a lower density and over a longer period as compared to the CRS (Cell-specific Reference Signal) defined in the LTE system. And, in a subframe into which this CSI-RS is inserted, REs (Resource Elements) of PDSCH (Physical Downlink Shared Channel) are mapped in such a manner as to surround REs including the CSI-RS.

CITATION LIST

Non Patent Literature

Non-Patent Literature 1: 3GPP, TR25.912 (V7.1.0), "Feasibility study for Evolved UTRA and UTRAN", September 2006

SUMMARY

In measurement of channel quality using a CSI-RS, measurement accuracy is sometimes deteriorated due to data interference from other cells. As described above, the CSI-RS is multiplexed at a low density and over a long period, it is necessary to protect the CSI-RS from the data interference from other cells. As a method for protecting the CSI-RS, there has been studied muting such that no user data is assigned to radio resources corresponding to CSI-RSs of another cells. In performing muting, a radio base station apparatus of a connected cell notifies the mobile terminal apparatus of information of CSI-RS position and muting position.

In the meantime, there has been studied, in LTE Rel-11 or later, coordinated multi-point transmission/reception (COMP) that is a technique to realize inter-cell orthogonalization for improving the system performance, though it is not supported in LTE Rel-10. CoMP is an inter-cell coordination technique and inter-cell coordination is needed even when the CSI-RS is protected as described above (other-cell interference mitigation measures).

The present invention was carried out in view of the foregoing and aims to provide a radio base station apparatus, a mobile terminal apparatus and a radio communication method capable of taking other-cell interference mitigation measures even in consideration of inter-cell coordination like CoMP.

The present invention provides a radio base station apparatus comprising: a generating section configured to generate notification information including subframe information of a cell and subframe information of another cell; and a transmitting section configured to transmit the notification information to a mobile terminal apparatus connected to the cell as a connected cell.

The present invention further provides a mobile terminal apparatus comprising: a receiving section configured to receive notification information including subframe information of a connected cell and subframe information of another cell; and a channel quality measuring section configured to measure channel quality of the connected cell with use of the subframe information of the connected cell and to measure channel quality of another cell with use of the subframe information of another cell.

The present invention further provides a radio communication method comprising the steps of: in a radio base station apparatus, generating notification information including subframe information of a serving cell and subframe information of another cell; and transmitting the notification information to a mobile terminal apparatus connected to the serving cell as a connected cell; and in the mobile terminal apparatus, receiving the notification information including the subframe information of the connected cell and the subframe information of another cell; and measuring channel quality of the connected cell with use of the subframe information of the connected cell and measuring channel quality of another cell with use of the subframe information of another cell.

According to the present invention, as notification information containing the subframe information of the serving cell and the subframe information of another cell is transmitted from the radio base station apparatus to the mobile terminal apparatus, it is possible for the mobile terminal apparatus to obtain the subframe information of another cell in addition to the subframe information of the serving cell. Therefore, it is possible to take other-cell interference mitigation measures even in consideration of the inter-cell coordination technique like CoMP.

DETAILED DESCRIPTION

First description is made, with reference to FIG. 1, about a CSI-RS that is one of reference signals employed in a successor system to the LTE system. The CSI-RS is a reference signal used in measurement of a channel state (CSI measurement) such as CQI (Channel Quality Indicator), PMI (Precoding Matrix Indicator) or RI (Rank Indicator). Different from CRS that is assigned to every subframe, the CSI-RS is assigned at predetermined intervals, for example, at intervals of 10 subframes. And, the CSI-RS is specified by parameters of position, sequence and transmission power. The position of the CSI-RS includes a subframe offset, period, subcarrier-symbol offset (index).

The CSI-RS is assigned, in one resource block defined in LTE, in such a manner as not to overlap control signals such as PDCCH (Physical Downlink Control CHannel) signals, user data such as PDSCH (Physical Downlink Shared CHannel) signals, other reference signals such as DM-RSs (Demodulation-Reference Signals) and CRSs (Cell-specific Reference Signals). One resource block is composed of 12 consecutive subcarriers in the frequency direction and 14 consecutive symbols in the time axis direction. From the viewpoint of suppression of PAPR (Peak-to-Average Power Ratio), two resource elements adjacent in the time axis direction are assigned in a set as resources capable of transmitting CSI-RSs.

Figure 1A:
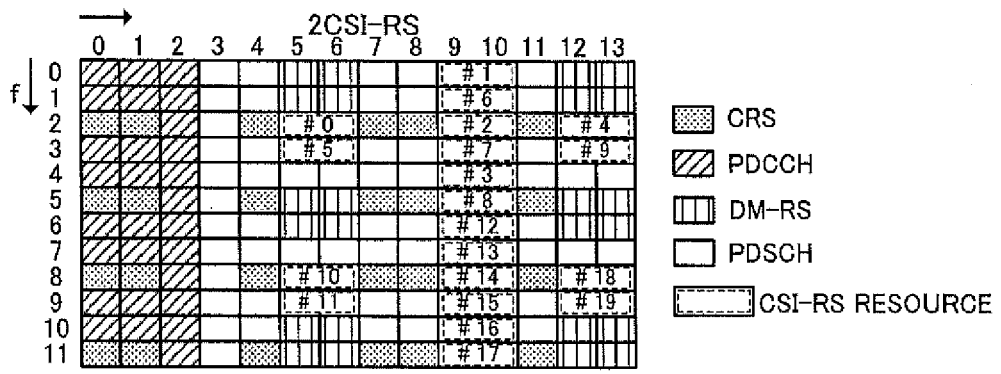
FIGS. 1A, 1B, and 1C provide diagrams each for explaining a CSI-RS allocation pattern in a resource block in accordance with one or more embodiments of the invention.
Figure 1B:
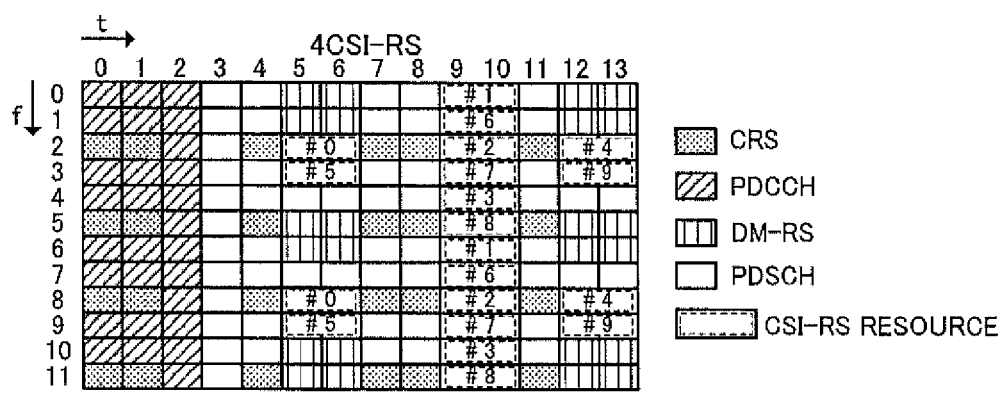

In the CSI-RS configuration illustrated in FIG. 1, 40 resource elements are prepared as CSI-RS resources (reference signal resources). For these 40 resource elements, CSI-RS patterns are set in accordance with the number of CSI-RS ports (number of antennas). In each CSI-RS pattern, one resource element is assigned for CSI-RS per CSI-RS port. When there are 2 CSI-RS ports, CSI-RSs are assigned to 2 out of 40 resource elements. Accordingly, in FIG. 1A, 20 CSI-RS patterns are set as indicated by the indexes #0 to #19 (CSI Configuration=0-19). Note that, for convenience of explanation, the same index is added to resource elements of one pattern.

Figure 1C:
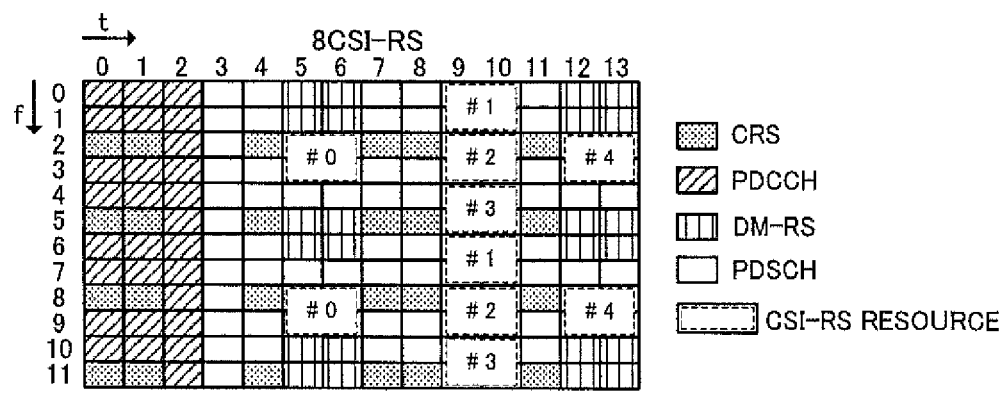
Figure 5:
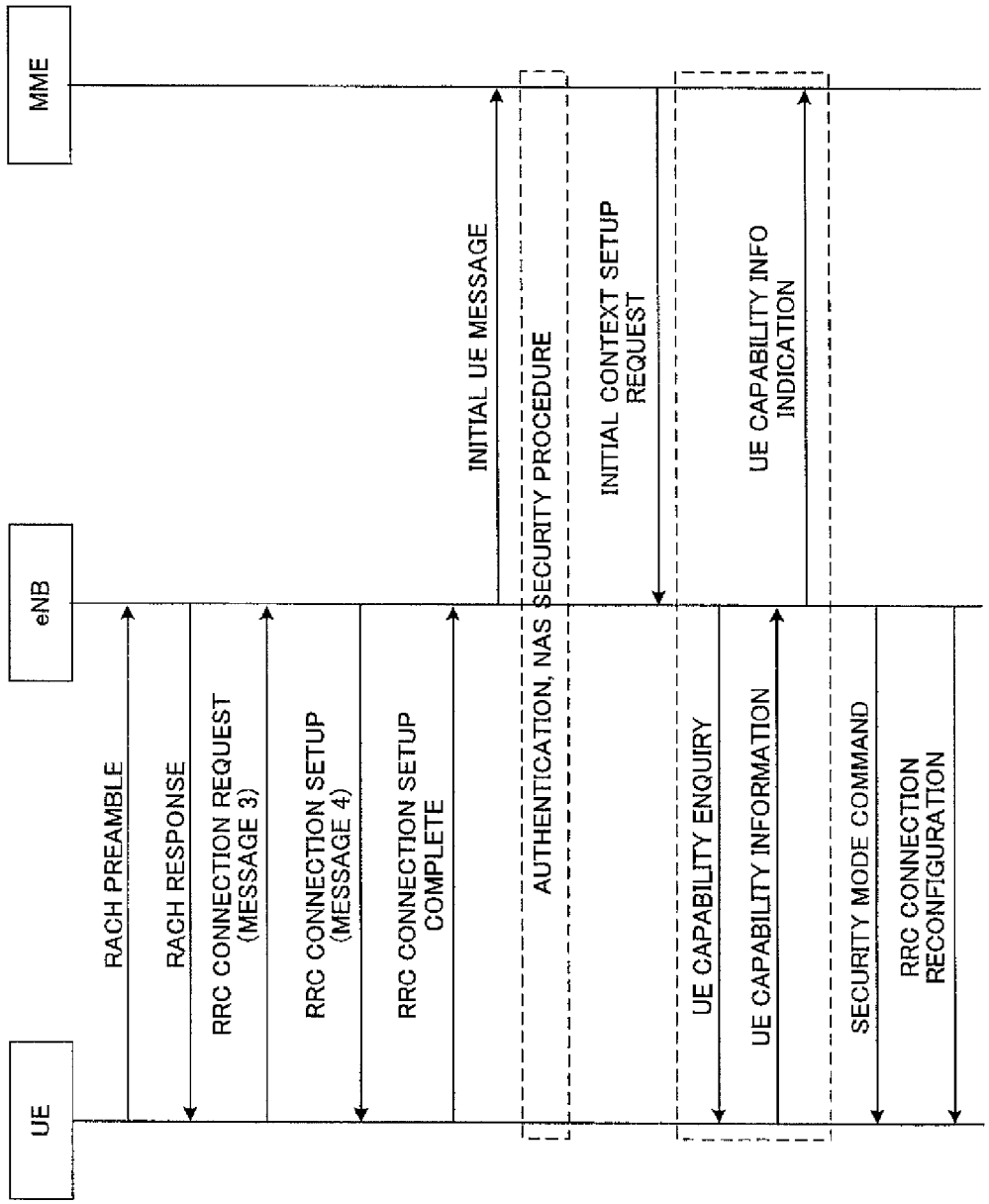
FIG. 5 is a sequence diagram for transmitting notification information in an individual signal in accordance with one or more embodiments of the invention.

When the number of CSI-RS ports is 4, CSI-RSs are assigned to 4 out of 40 resource elements. Accordingly, in FIG. 1B, 10 CSI-RS patterns are set as indicated by the indexes #0 to #9 (CSI Configuration=0-9). When the number of CSI-RS ports is 8, CSI-RSs are assigned to 8 out of 40 resource elements. Accordingly, as illustrated in FIG. 1C, 5 CSI-RS patterns are set as indicated by the indexes #0 to #4 (CSI Configuration=0-4). Note that, in each CSI-RS pattern, user data is assigned to resource elements where no CSI-RS is assigned. And, the CSI-RSs are assigned based on the selected CSI-RS pattern (CSI Configurations) that varies among cells thereby to prevent interference between the cells.

Figure 2A:
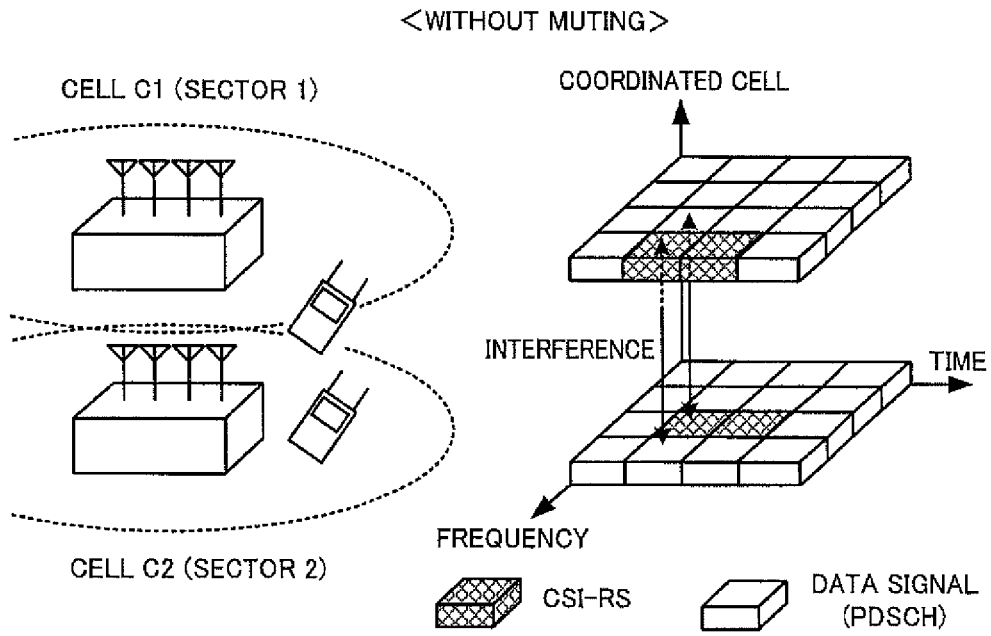
FIGS. 2A and 2B provide diagrams each for explaining muting in CQI measurement using CSI-RSs in accordance with one or more embodiments of the invention.

Here, in CSI measurement using CSI-RSs, the measurement accuracy is sometimes deteriorated by data interference from other cells. For example, in the case illustrated in FIG. 2A, user data is assigned, in a downlink resource block of the cell C1, corresponding to the CSI-RSs of another cell C2. And, user data is assigned, in a downlink resource block of the cell C2, corresponding to the CSI-RSs of another cell C1. Such user data becomes an interference component for CSI-RSs of each cell, which may cause deterioration of CSI measurement accuracy in a mobile terminal apparatus positioned on the boundary of the cells C1 and C2.

Figure 2B:
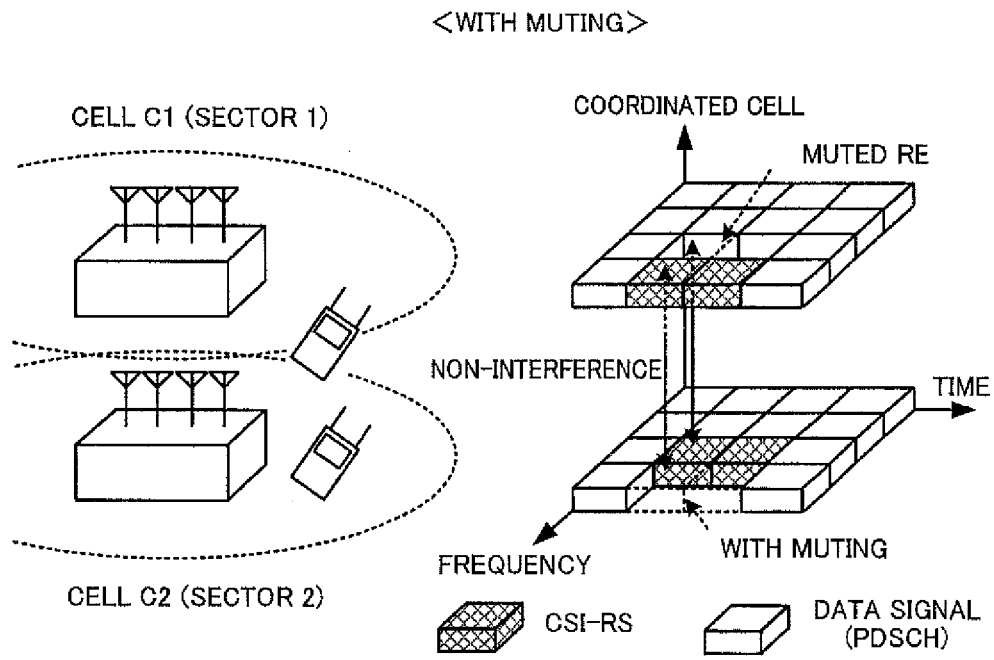

In order to prevent deterioration of CSI measurement accuracy due to the assignment position of user data, there has been studied muting. In muting, as illustrated in FIG. 2B, no user data is assigned to the resources corresponding to CSI-RSs of another cell. The downlink resource block of the cell C1 is subjected to muting corresponding to the CSI-RSs of the cell C2. And, the downlink resource block of the cell C2 is subjected to muting corresponding to the CSI-RSs of the cell C1. With this structure, it is possible to remove interference components for CSI-RSs due to user data of another cell, thereby improving the CSI measurement accuracy in the mobile terminal apparatus.

Here, a resource subjected to muting may be defined as a resource to which no data is assigned or a resource to which data is assigned as far as it does not cause interference with a CSI-RS of another cell. Besides, a resource subjected to muting may be defined as a resource that is transmitted with such transmission power as does not cause interference to a CSI-RS of another cell.

When a radio base station apparatus notifies a mobile terminal apparatus of muting, such notification is performed using a CSI-RS pattern. In this case, muting may be communicated in a bitmap format where there is one-to-one correspondence between an index (CSI configuration) to number a CSI-RS pattern and presence or absence of muting (whether or not to perform muting). And, notification of muting and notification of CSI-RSs may be performed using CSI-RS patterns that are different in number of CSI-RS ports.

Figure 3:
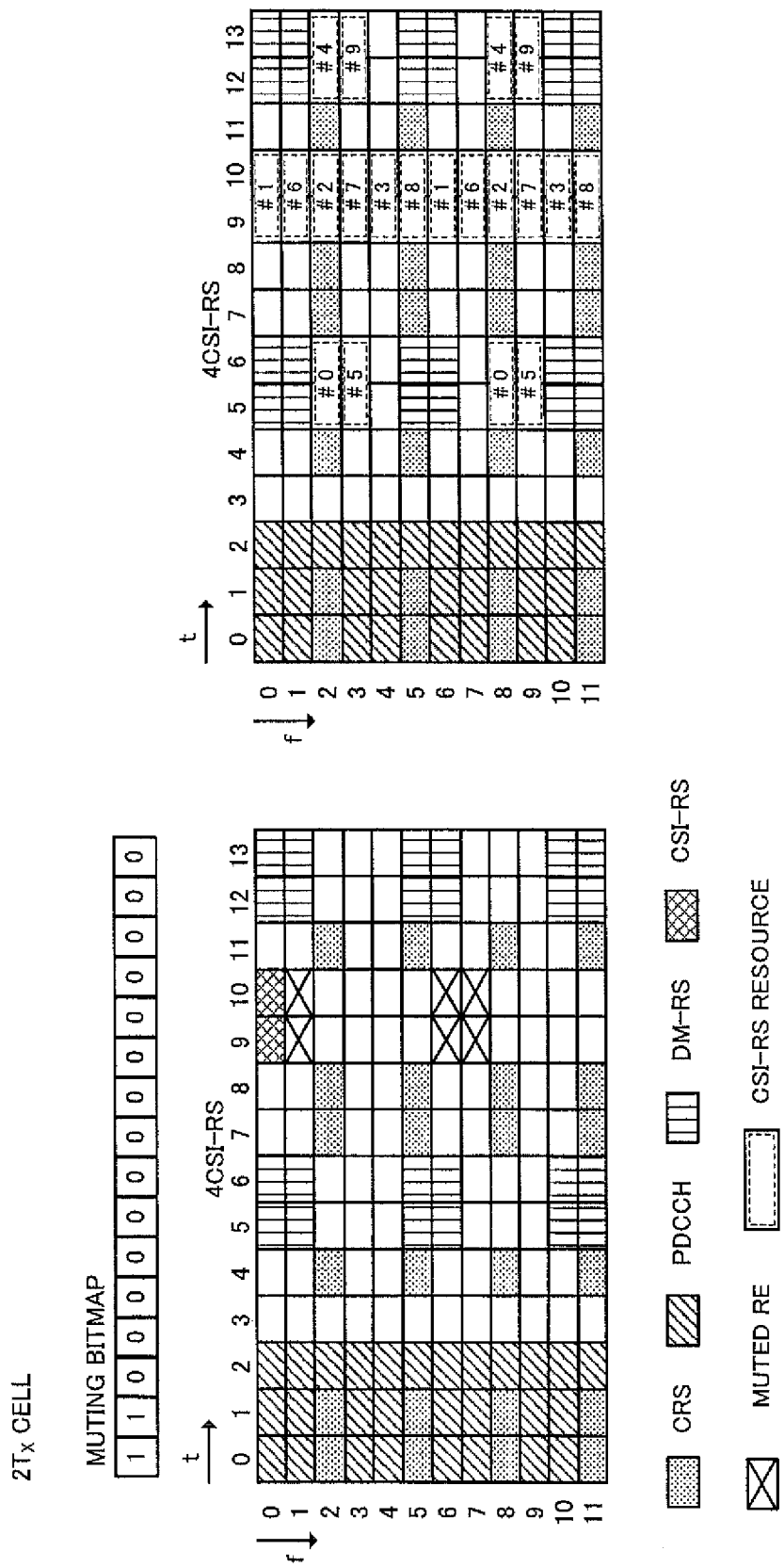
FIG. 3 is a diagram illustrating an example of a muting notifying method in accordance with one or more embodiments of the invention.

FIG. 3 illustrates an example where muting notification is performed using a CSI-RS pattern when the number of CSI-RS ports is 4. Here, muting is set for CSI-RS resources indicated by the indexes #0 and #1 (CSI Configuration=0, 1). In this case, 16-bit bitmap information [1100000000000000] is given corresponding to an index of an FDD (Frequency Division Duplex) normal pattern with a TDD (Time Division Duplex) additional pattern. In the bitmap information, "1" is set to a resource subjected to muting, and "0" is set to a resource not subjected to muting. And, the radio base station apparatus notifies the mobile terminal apparatus of the bitmap information as well as a transmission cycle (Duty Cycle) and a subframe offset.

Besides, in FIG. 3, CSI-RS notification is performed using a CSI-RS pattern where the number of CSI-RS ports is 2. Here, CSI-RSs are assigned to CSI-RS resources indicated by the index #1 (CSI Configuration=1) in FIG. 1A. Accordingly, muting is set to muting resources indicated by the bitmap information, excluding resources to which CSI-RSs are assigned. The radio base station apparatus notifies the mobile terminal apparatus of resources to which CSI-RSs are assigned as well as the muting information.

Further, in LTE Rel-10, if there is collision between a subframe to transmit CSI-RSs and a paging-multiplexed subframe, a SIB (System Information Block) X-multiplexed subframe, an MIB (Master Information Block)-multiplexed subframe, a synchronization signal (PSS (Primary Synchronization Signal) or SSS (Secondary Synchronization Signal))-multiplexed subframe, no CSI-RS is transmitted. The radio base station apparatus notifies the mobile terminal apparatus of information of subframes where paging or the like is multiplexed as mentioned above.

Here, in LTE Rel-10, CSI-RS transmission/muting may be applied only in consideration of the home cell (cell connecting to a mobile terminal), but, assuming the inter-cell coordination technique, such as CoMP, that is to be studied in LTE Rel-11 or later, the mobile terminal apparatus needs CSI-RS transmission/muting information of not only the home cell but also other cells. Then, in order to take other-cell interference mitigation measures even in consideration of the inter-cell coordination technique such as CoMP, the present inventors have proposed signaling of subframe information of other cells, for example, CSI-RS transmission/muting information. Note that the subframe information of other cells is not limited to CSI-RS transmission/muting information, but may include other information relating to subframes (for example, information of subframes multiplexed with paging SIBX, MIB and/or synchronization signals) of other cells in consideration of the inter-cell coordination technique.

Figure 4:
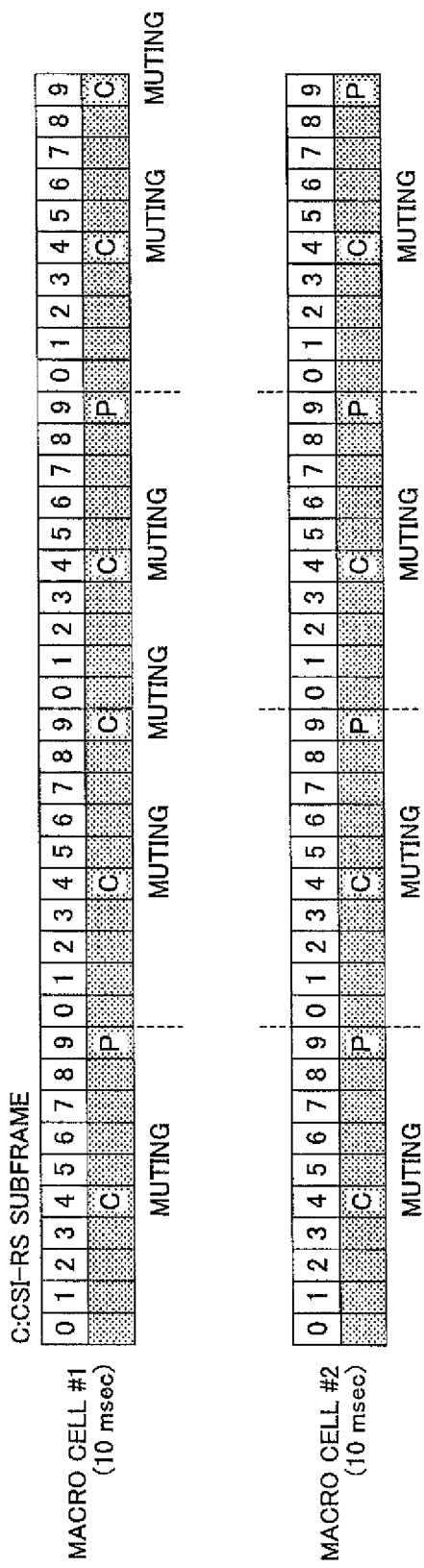
FIG. 4 is a diagram for explaining CSI-RS transmission/muting of a serving cell and another cell in accordance with one or more embodiments of the invention.

For example, in a mobile terminal apparatus to which CoMP is applied, as illustrated in FIG. 4, information of CSI-RS transmission/muting is required of not only the home cell (for example, macro cell #1), but also another cell (for example, macro cell #2). With this information, it is possible to take other-cell interference mitigation measures even in consideration of inter-cell coordination technique such as CoMP.

That is, the gist of the present invention is to, in a radio base station apparatus, generate notification information including subframe information of a home cell and subframe information of another cell and transmit the notification information to a mobile terminal apparatus connected to the home cell as a connected cell and in the mobile terminal apparatus, receive the notification information including the subframe information of the connected cell and the subframe information of another cell, measure channel quality of the connected cell using the subframe information of the connected cell and measure channel quality of another cell using the subframe information of another cell, thereby taking other-cell interference mitigation measures even in consideration of the inter-cell coordination technique like CoMP.

In the present invention, the subframe information is information about subframes of another cell in consideration of the inter-cell coordination technique, or information for CSI-RS transmission (non-transmission)/muting (CSI-RS/Muting configuration information) and includes information of subframes multiplexed with paging, SIBX, MIB (broadcast information) and/or synchronization signals, if necessary. Specifically, information of CSI-RS transmission (non-transmission) is information indicating a subframe to transmit a CSI-RS or information indicating a subframe not to transmit a CSI-RS, including a CSI-RS index and a CSI-RS parameter. Muting information is information indicating a subframe to be subjected to muting, including muting resource identification information, muting interval information and muting index.

Here, the subframe information of another cell is information of subframes multiplexed with SIBX, MIB and/or synchronization signals and does not necessarily include CSI-RS index, CSI-RS parameter, muting resource identification information, muting interval information and muting index.

Accordingly, the subframe information of the home cell includes parameters of CSI-RS/muting of the home cell, and paging and broadcast information of the home cell, and the subframe information of another cell includes paging and broadcast information of another cell. Here, the subframe information of another cell may include parameters of CSI-RS/muting of another cell.

Here, description is made about a method of transmitting, from the radio base station apparatus to the mobile terminal apparatus, the subframe information of the home cell and/or subframe information of another cell (notification information). The method of transmitting notification information includes (1) a method using an individual signal and (2) a method using a broadcast signal. These transmission methods may be embodied in the following forms of (a) to (d): (a) subframe information of the home cell and subframe information of another cell are transmitted in individual signals, (b) subframe information of the home cell and subframe information of another cell are transmitted in broadcast signals, (c) subframe information of the home cell is transmitted in an individual signal and subframe information of another cell is transmitted in a broadcast signal, and (d) subframe information of the home cell is transmitted in a broadcast signal and subframe information of another cell is transmitted in an individual signal.

(1) When notification information is transmitted in individual signals, transmission is performed using RRC CONNECTION RECONFIGURATION signals in the processing procedure illustrated in FIG. 5. In this processing procedure, first, the mobile terminal apparatus UE transmits a RACH preamble to the radio base station apparatus eNB. When receiving the RACH preamble, the radio base station apparatus eNB transmits a RACH response to the mobile terminal apparatus UE. Then, the mobile terminal apparatus UE transmits RRC CONNECTION REQUEST (Message 3) to the radio base station apparatus eNB. When receiving RRC CONNECTION REQUEST (Message 3), the radio base station apparatus eNB transmits RRC CONNECTION SETUP (Message 4) to the mobile terminal apparatus UE.

When receiving RRC CONNECTION SETUP (Message 4), the mobile terminal apparatus UE transmits RRC CONNECTION SETUP COMPLETE to the radio base station apparatus eNB. When receiving RRC CONNECTION SETUP COMPLETE, the radio base station apparatus eNB transmits INITIAL UE MESSAGE to a mobility management node MME. With this transmission, Authentication and NAS security procedure are performed between the mobile terminal apparatus UE and the mobility management node MME. Then, the mobility management node MME transmits INITIAL CONTEXT SETUP REQUEST to the radio base station apparatus eNB.

If UE CAPABILITY is not contained in the INITIAL CONTEXT SETUP REQUEST, the radio base station apparatus eNB transmits UE CAPABILITY ENQUIRY to the mobile terminal apparatus UE. When receiving UE CAPABILITY ENQUIRY, the mobile terminal apparatus UE transmits UE CAPABILITY INFORMATION to the radio base station apparatus eNB. Then, the radio base station apparatus eNB transmits UE CAPABILITY INFO INDICATION to the mobility management node MME.

Figure 6:
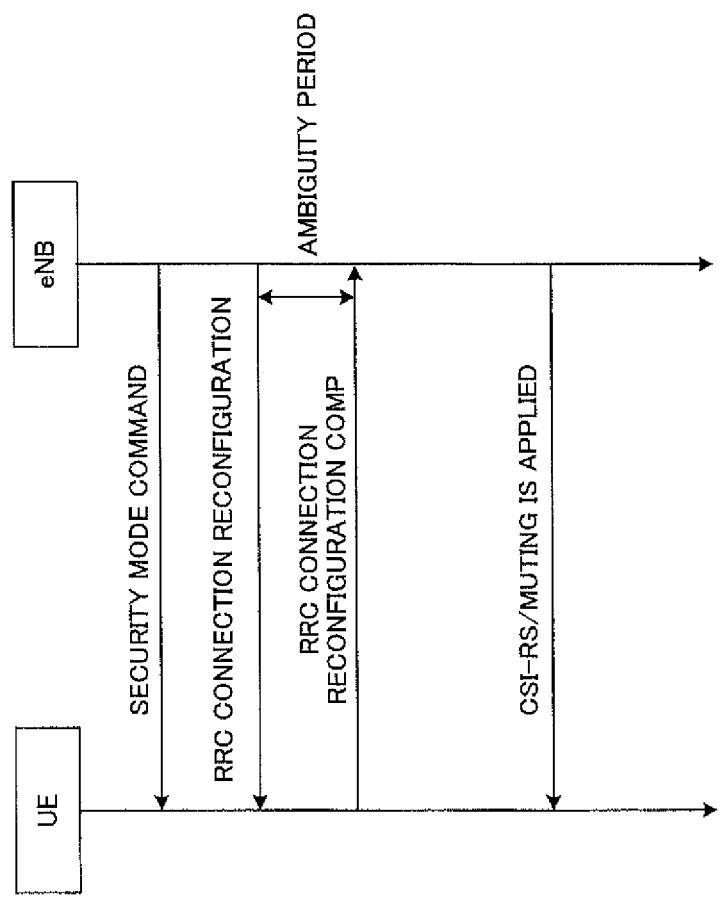
FIG. 6 is a sequence diagram for transmitting notification information in an individual signal in accordance with one or more embodiments of the invention.

Then, the radio base station apparatus eNB transmits SECURITY MODE COMMAND to the mobile terminal apparatus UE. After that, the radio base station apparatus eNB transmits, to the mobile terminal apparatus UE, RRC CONNECTION RECONFIGURATION including the notification information (SI-RS/Muting configuration information). Then, as illustrated in FIG. 6, when receiving RRC CONNECTION RECONFIGURATION, the mobile terminal apparatus UE transmits RRC CONNECTION RECONFIGURATION COMP to the radio base station apparatus eNB. After receiving RRC CONNECTION RECONFIGURATION COMP, that is, after a lapse of ambiguity period, transmission of downlink data addressed to the mobile terminal apparatus UE in subframes to transmit CSI-RSa and transmission stop of downlink data from an adjacent cell (CSI-RS/muting) are started.

(2) The notification information may be transmitted in broadcast signals. Note that transmission of notification information using broadcast signals means transmission of notification information using subframes multiplexed with SIBX or transmission of notification information using subframes multiplexed with MIB.

When receiving the notification information (CSI-RS/Muting configuration information) transmitted in the above-mentioned method (1) or (2), the mobile terminal apparatus UE performs channel quality measurement based on this notification information. Specifically, the mobile terminal apparatus UE measures channel quality of the connected cell with use of the subframe information of the connected cell and measures channel quality of another cell with use of the subframe information of another cell.

The radio base station apparatus eNB obtains the subframe information of another cell from a radio base station apparatus eNB of another cell. For example, the radio base station apparatus eNB can obtain the subframe information of another cell from the radio base station apparatus eNB of another cell via an X2 interface.

In this way, the mobile terminal apparatus UE can obtain the subframe information of the home cell as well as the subframe information of another cell. Therefore, it is possible to take other-cell interference mitigation measures even in consideration of the inter-cell coordination technique like CoMP.

Figure 7:
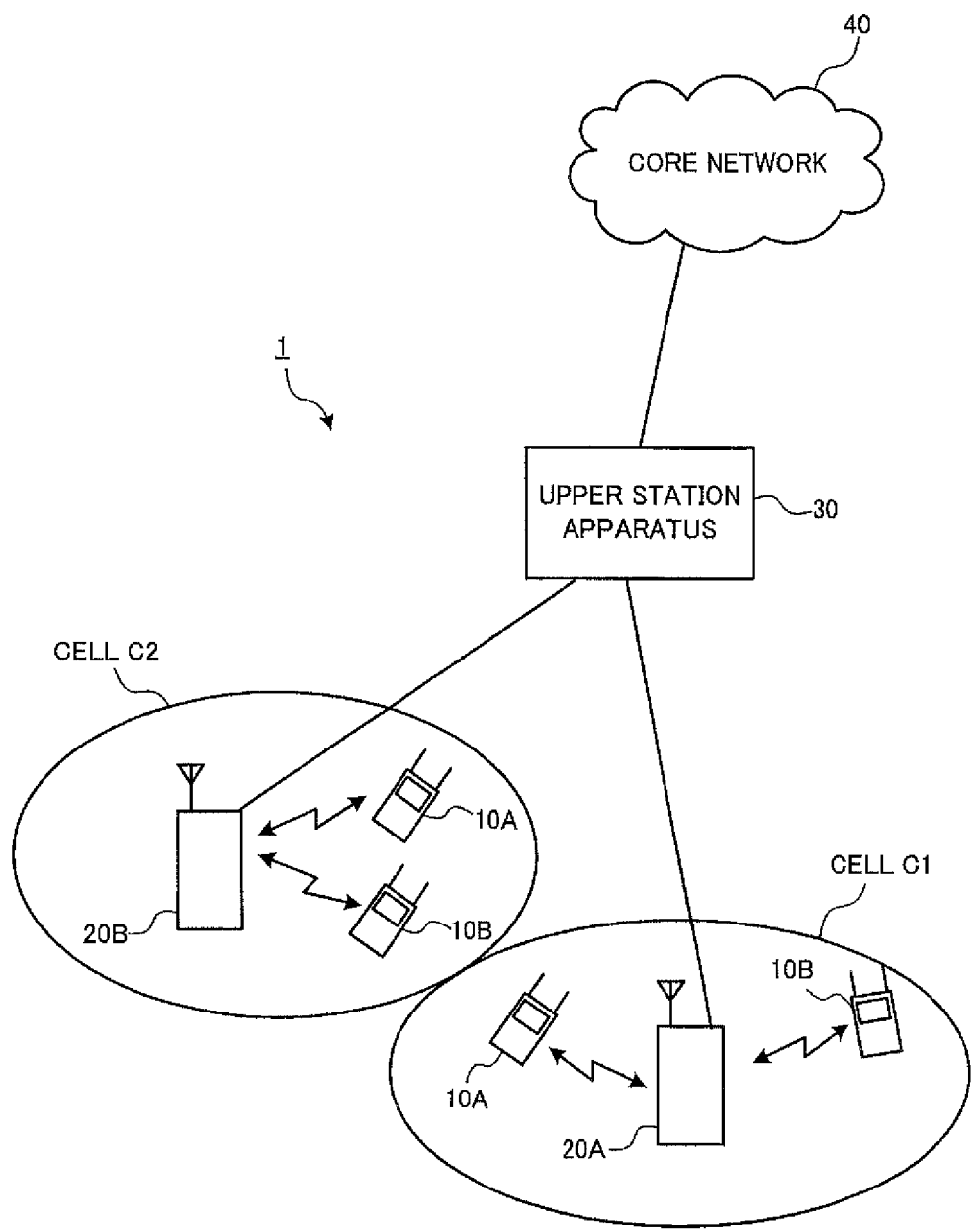
FIG. 7 is a diagram for explaining a system configuration of a radio communication system in accordance with one or more embodiments of the invention.

Here, description is made in detail about a radio communication system according to an embodiment of the present invention. FIG. 7 is a diagram for explaining a system configuration of the radio communication system according to the present embodiment. Here, the radio communication system illustrated in FIG. 7 is, for example, an LTE system or a system including SUPER 3G. In this radio communication system, carrier aggregation is used such that plural fundamental frequency blocks are aggregated into one band, each fundamental frequency block corresponding to the system band of the LTE system. Besides, this radio communication system may be called IMT-Advanced or 4G.

As illustrated in FIG. 7, the radio communication system 1 has base station apparatuses 20A and 20B and a plurality of first or second mobile terminal apparatuses 10A and 10B which communicate with the radio base station apparatuses 20A and 20B. The radio base station apparatuses 20A and 20B are connected to an upper station apparatus 30, which is connected to a core network 40. The radio base station apparatuses 20A and 20B are connected to each other by wire connection or wireless connection. The first and second mobile terminal apparatuses 10A and 10B can communicate with the radio base station apparatuses 20A and 20B in the cells C1 and C2, respectively. The upper station apparatus 30 includes, for example, an access gateway apparatus, a radio network controller (RNC), a mobility management entity (MME) and so on, but is by no means limited to these.

The first and second mobile terminal apparatuses 10A and 10B include LTE terminals and LTE-A terminals. In the following description, these are treated collectively as first and second mobile terminal apparatuses, unless specified otherwise. Besides, for convenience of explanation, it is assumed that it is the first and second mobile terminal apparatuses 10A and 10B that perform radio communications with the radio base station apparatuses 20A and 20B, but more generally, the mobile terminal apparatus may be user equipment (UE) including a mobile terminal apparatus and a fixed terminal apparatus.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

Here, description is made about a communication channel.

Downlink communication channels include a PDSCH (Physical Downlink Shared CHannel) as a downlink data channel used by the first and second mobile terminal apparatuses 10A and 10B on a shared basis and a downlink L1/L2 control channel (PDCCH, PCFICH, PHICH). PDSCH is used to transmit transmission data and higher control information. PDCCH (Physical Downlink Control CHannel) is used to transmit scheduling information of PUSCH and PDSCH and so on. PCFICH (Physical Control Format Indicator CHannel) is used to transmit the number of OFDM symbols used in PDCCH. PHICH (Physical Hybrid-ARQ Indicator CHannel) is used to transmit ACK/NACK of HARQ for PUSCH.

The uplink communication channels include a PUSCH (Physical Uplink Shared CHannel), which is an uplink data channel used by each mobile terminal apparatus on a shared basis, and a PUCCH (Physical Uplink Control CHannel), which is an uplink control channel. This PUSCH is used to transmit transmission data and higher control information. Furthermore, the PUCCH is used to transmit downlink radio quality information (CQI: Channel Quality Indicator), ACK/NACK, and so on.

Figure 8:
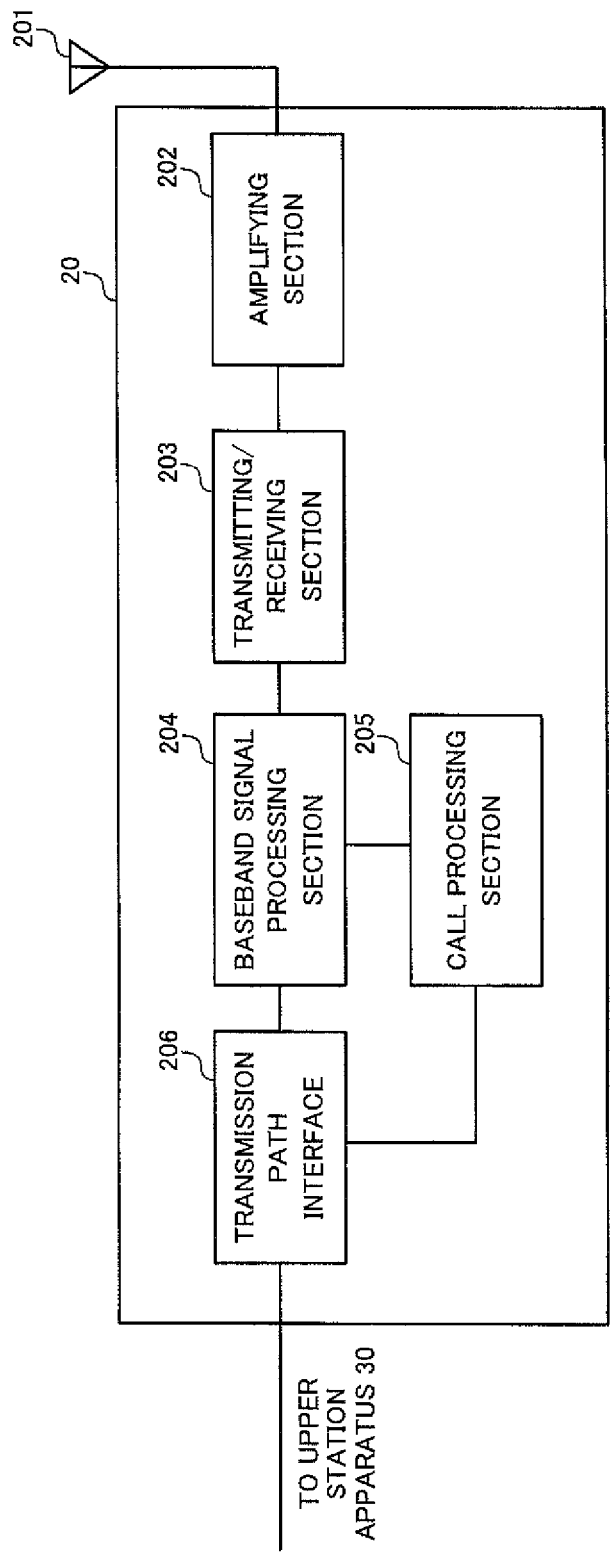
FIG. 8 is a diagram for explaining an overall configuration of a radio base station apparatus in accordance with one or more embodiments of the invention.

With reference to FIG. 8, an overall configuration of the radio base station apparatus according to the present embodiment will be described. Here, as the radio base station apparatuses 20A and 20B are the same in structure, they are treated collectively as a base station apparatus 20. And, as the mobile terminal apparatuses 10A and 10B are the same in structure, they are treated collectively as a mobile terminal apparatus 10. The radio base station apparatus 20 has a transmitting/receiving antenna 201, an amplifying section 202, a transmitting/receiving section (notifying section) 203, a baseband signal processing section 204, a call processing section 205 and a transmission path interface 206. Transmission data that is transmitted on the downlink from the radio base station apparatus 20 to the mobile terminal apparatus is input into the baseband signal processing section 204, through the transmission path interface 206, from the upper station apparatus 30.

In the baseband signal processing section 204, a downlink data channel signal is subjected to PDCP layer processing, RLC (Radio Link Control) layer transmission processing such as RLC retransmission control transmission processing and division and coupling of transmission data, MAC (Medium Access Control) retransmission control, including, for example, HARQ transmission processing, scheduling, transport format selection, channel coding, inverse fast Fourier transform (IFFT) processing, and precoding processing. Furthermore, as with signals of the physical downlink control channel, which is a downlink control channel, transmission processing is performed, including channel coding and inverse fast Fourier transform.

Also, the baseband signal processing section 204 notifies the mobile terminal apparatuses 10 connected to the same cell of control information for allowing each of the mobile terminal apparatuses 10 to wirelessly communicate with the radio base station apparatus 20, by a broadcast channel. Broadcast information for communication in this cell includes, for example, the uplink or downlink system bandwidth, identification information of a root sequence (root sequence index) for generating random access preamble signals in the PRACH (Physical Random Access CHannel), and so on.

In the transmitting/receiving section 203, the baseband signal output from the baseband signal processing section 204 is subjected to frequency conversion processing into a radio frequency band. The amplifying section 202 amplifies the radio-frequency signal having been subjected to frequency conversion, and outputs the result to the transmitting/receiving antenna 201.

Meanwhile, as for signals to be transmitted on the uplink from the mobile terminal apparatus 10 to the radio base station apparatus 20, a radio frequency signal that is received in the transmitting/receiving antenna 201 is amplified in the amplifying section 202, subjected to frequency conversion and converted into a baseband signal in the transmitting/receiving section 203, and is input to the baseband signal processing section 204.

The baseband signal processing section 204 performs FFT processing, IDFT processing, error correction decoding, MAC retransmission control reception processing, and RLC layer and PDCP layer reception processing on the transmission data included in the baseband signal that is received on the uplink. The decoded signal is transferred to the upper station apparatus 30 through the transmission path interface 206.

The call processing section 205 performs call processing such as setting up and releasing a communication channel, manages the state of the radio base station apparatus 20 and manages the radio resources.

Figure 9:
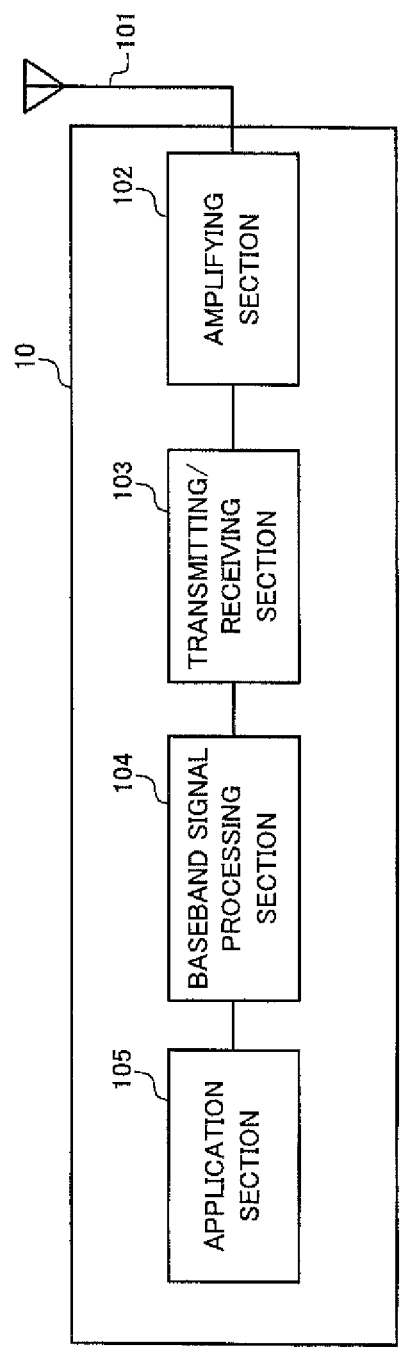
FIG. 9 is a diagram for explaining an overall configuration of a mobile terminal apparatus in accordance with one or more embodiments of the invention.

Next, referring to FIG. 9, an overall configuration of the mobile terminal apparatus according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmitting/receiving section (receiving section) 103, a baseband signal processing section 104 and an application section 105.

As for downlink data, a radio frequency signal received in the transmitting/receiving antenna 101 is amplified in the amplifying section 102, and subjected to frequency conversion and converted into a baseband signal in the transmission/reception section 103. This baseband signal is subjected to reception processing such as FFT processing, error correction decoding and retransmission control and so on, in the baseband signal processing section 104. In this downlink data, downlink transmission data is transferred to the application section 105. The application section 105 performs processing related to higher layers above the physical layer and the MAC layer. In the downlink data, broadcast information is also transferred to the application section 105.

On the other hand, uplink transmission data is input from the application section 105 to the baseband signal processing section 104. In the baseband signal processing section 104, mapping processing, retransmission control (HARQ) transmission processing, channel coding, DFT processing, IFFT processing and so on are performed. The baseband signal output from the baseband signal processing section 104 is subjected to frequency conversion processing in the transmitting/receiving section 103 and converted into a radio frequency band, and, after that, the frequency-converted radio frequency signal is amplified in the amplifying section 102 and transmitted from the transmitting/receiving antenna 101.

Figure 10:
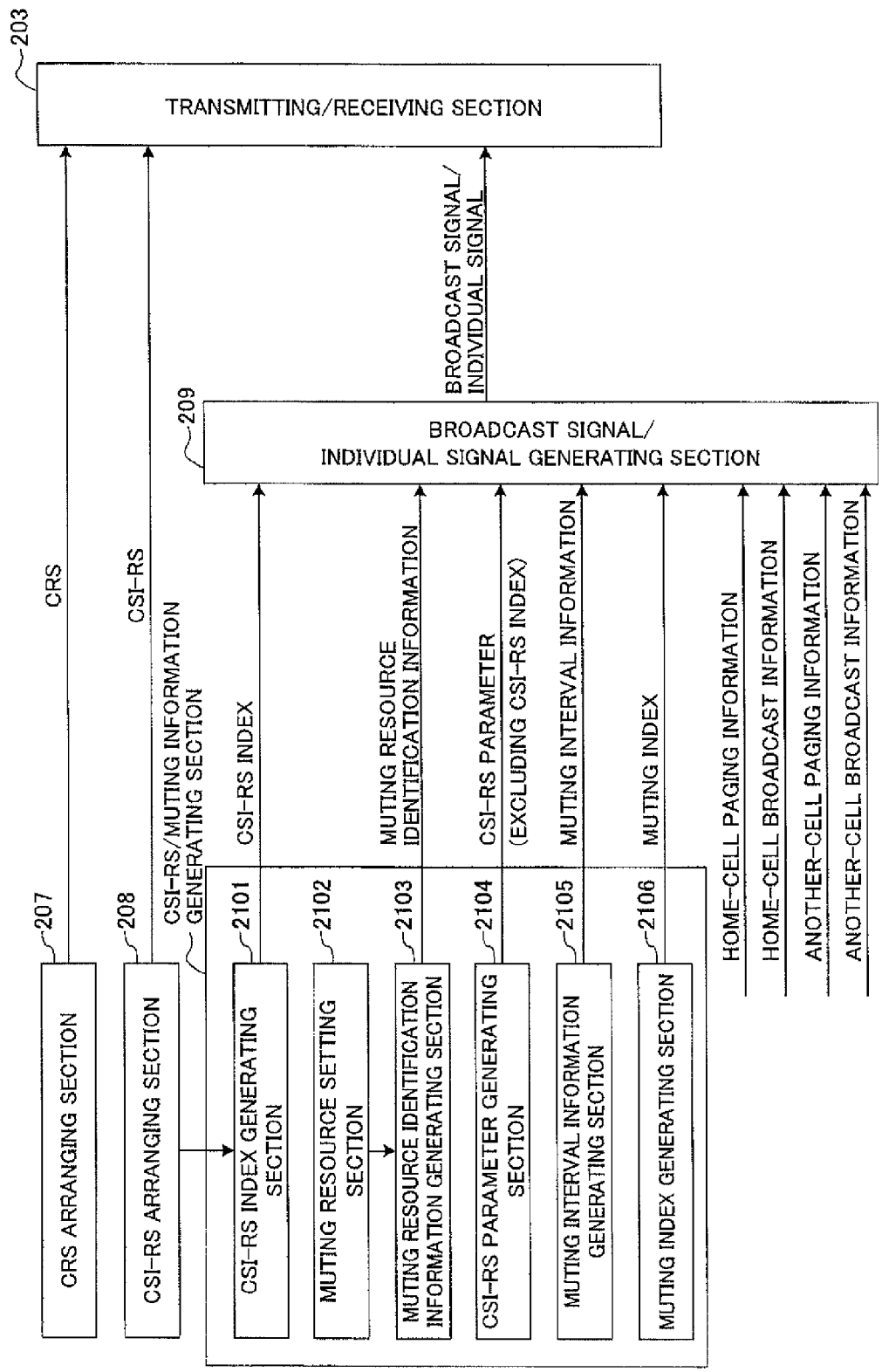
FIG. 10 is a functional block diagram of the radio base station apparatus according to the radio communication method in accordance with one or more embodiments of the invention.

With reference to FIG. 10, description is made about functional blocks of the radio base station apparatus. Here, the functional blocks shown in FIG. 10 represent processing substantially performed in the baseband signal processing section. And, the functional blocks shown in FIG. 10 are simplified, and needless to say, the baseband signal processing section is equipped with standard parts. Further, in the following description, it is assumed that an index to identify a resource where CSI-RS is allocated is called CSI-RS index.

As illustrated in FIG. 10, the radio base station apparatus 20 has a CRS arranging section 207, a CSI-RS arranging section 208, a CSI-RS/muting information generating section 210, and a broadcast signal/individual signal generating section 209. The CSI-RS/muting information generating section 210 has a CSI-RS index generating section 2101, a muting resource setting section 2102, a muting resource identification information generating section 2103, a CSI-RS parameter generating section 2104, a muting interval information generating section 2105 and a muting index generating section 2106.

The CRS arranging section 207 allocates CRSs in CRS transmission resources in a resource block. The CSI-RS arranging section 208 allocates CSI-RSs in CSI-RS transmission resources in a resource block in accordance with the number of CSI-RS ports.

The CSI-RS index generating section 2101 of the CSI-RS/muting information generating section 210 generates a CSI-RS index corresponding to the resources where the CSI-RSs are allocated by the CSI-RS arranging section 208. The CSI-RS index generated by the CSI-RS index generating section 2101 is output to the broadcast signal/individual signal generating section 209 as one of CSI-RS parameters.

The muting resource setting section 2102 sets resources corresponding to the resources where CSI-RSs are allocated in a neighbor cell, as muting resources. In this embodiment, the muting resources may be resources where no data is assigned or may be defined as resources where data is assigned as far as no interference is given to CSI-RSs of the neighbor cell. Further, the muting resources may be resources that are transmitted with such transmission power as does not cause interference to CSI-RSs of the neighbor cell.

The muting resource identification information generating section 2103 generates muting resource identification information to be used in the muting notification method. The muting resource identification information includes, for example, bitmap information, muting resource allocation patterns and so on.

When the muting resource identification information is transmitted to the mobile terminal apparatus 10, each resource indicated by the muting resource identification information is recognized as a muting resource at the mobile terminal apparatus 10 side. The muting resource identification information is output to the broadcast signal/individual signal generating section 209 as one of muting parameters.

The CSI-RS parameter generating section 2104 generates parameters such as CSI-RS sequence and transmission power other than the CSI-RS index. The CSI-RS parameter generated by the CSI-RS parameter generating section 2104 is output to the broadcast signal/individual signal generating section 209.

The muting interval information generating section 2105 generates muting interval information indicating a subframe transmission interval where CSI-RS transmission timings are matched between cells (muting interval). The muting interval information generating section 2105 generates muting interval information based on a transmission cycle of CSI-RSs obtained from a neighbor cell and a transmission cycle of CSI-RSs of the home cell. The muting interval information generated by the muting interval information generating section 2105 is output to the broadcast signal/individual signal generating section 209.

The muting index generating section 2106 generates a muting resource index. The muting index is transmitted to the mobile terminal apparatus 10, as a substitute for the muting resource identification information (bitmap information, muting resource arranging pattern). The muting index generated by the muting index generating section 2106 is output to the broadcast signal/individual signal generating section 209.

The broadcast signal/individual signal generating section 209 generates a broadcast signal or an individual signal including the subframe information of the home cell (CSI-RS index, CSI-RS parameter, muting resource identification information, muting interval information, muting index of the home cell, paging information of the home cell (information of subframes multiplexed with paging), broadcast information of the home cell (information of subframes multiplexed with MIB or SIB)) and information of subframes of another cell (paging information of another cell (information of subframes multiplexed with paging) and broadcast information of another cell (information of subframes multiplexed with MIB or SIB).

In the broadcast signal/individual signal generating section 209, (a) when subframe information of the home cell and subframe information of another cell are transmitted in an individual signal, the individual signal including the subframe information of the home cell and the subframe information of another cell is generated. (b) When subframe information of the home cell and subframe information of another cell are transmitted in a broadcast signal, the broadcast signal including the subframe information of the home cell and the subframe information of another cell is generated. (c) When subframe information of the home cell is transmitted in an individual signal and subframe information of another cell is transmitted in a broadcast signal, the individual signal including the subframe information of the home cell and the broadcast signal including the subframe information of another cell are generated. (d) When subframe information of another cell is transmitted in an individual signal and subframe information of the home cell is transmitted in a broadcast signal, the individual signal including the subframe information of another cell and the broadcast signal including the subframe information of the home cell are generated.

The transmitting/receiving section 203 transmits CRS, CSI-RSs and broadcast/individual signals to the mobile terminal apparatus 10.

Figure 11:
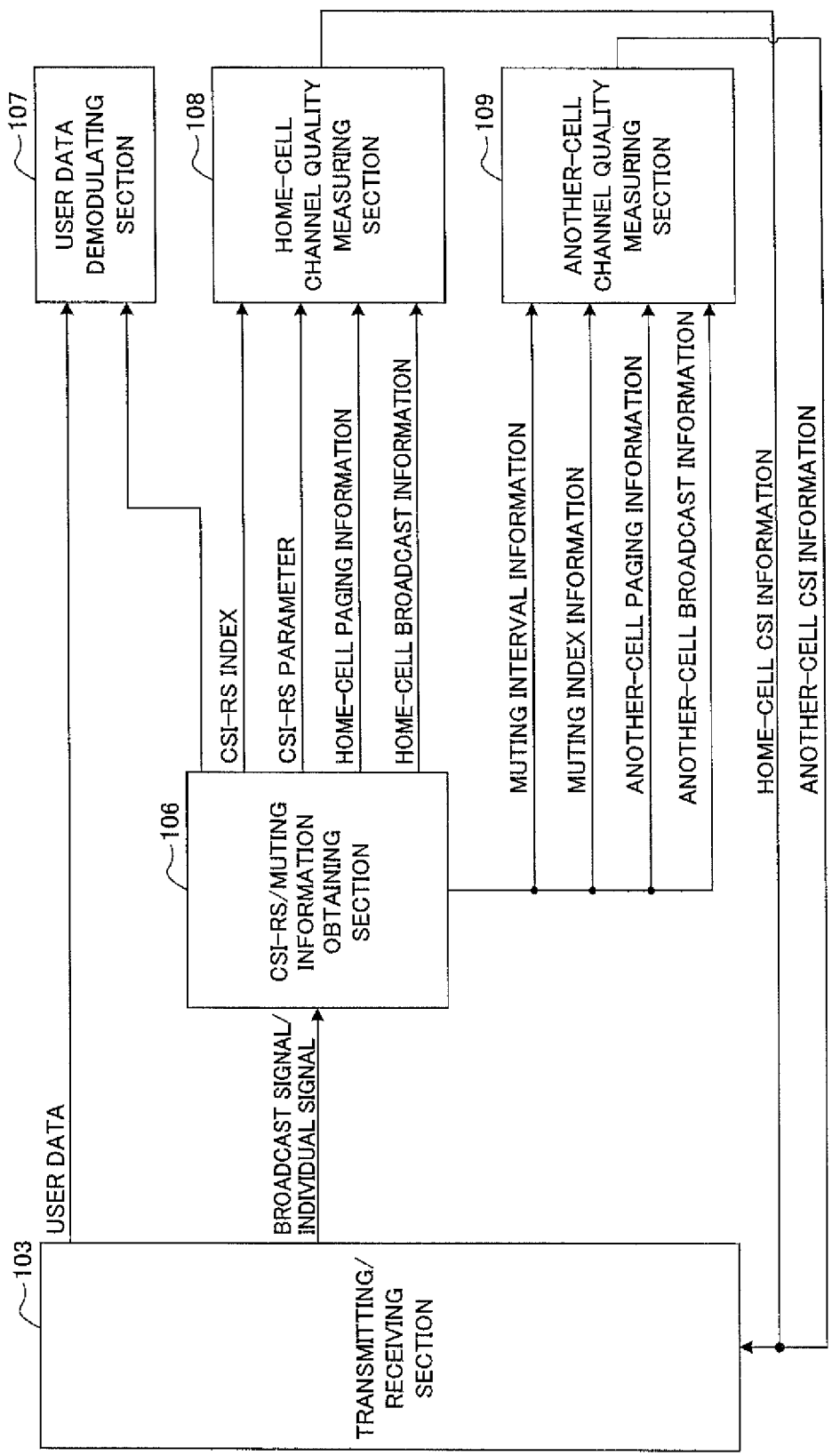
FIG. 11 is a functional block diagram of the mobile terminal apparatus according to the radio communication method in accordance with one or more embodiments of the invention.

FIG. 11 is an explanatory view of the functional blocks principally for CQI measurement by the mobile terminal apparatus. Here, the functional blocks shown in FIG. 11 represent processing substantially performed in the baseband signal processing section. And, the functional blocks shown in FIG. 11 are simplified for explanation of the present invention, and needless to say, the baseband signal processing section is equipped with standard parts.

As illustrated in FIG. 11, the mobile terminal apparatus 10 has a transmitting/receiving section 103, a CSI-RS/muting information obtaining section 106, a user data demodulating section 107, a home cell channel quality measuring section 108, and an other-cell channel quality measuring section 109. The transmitting/receiving section 103 receives CRSs, CSI-RSs and broadcast/individual signals from the radio base station apparatus 20.

The user data demodulating section 107 demodulates user data received through the transmitting/receiving section 103. The user data demodulating section 107 ignores the muting resource indicated by the muting resource identification information and demodulates the user data. This contributes to improvement of throughput of demodulation processing and demodulation accuracy. Note that instead of the user data demodulating section 107, the CSI-RS/muting information obtaining section 106 may perform the demodulation processing of the user data.

The CSI-RS/muting information obtaining section 106 demodulates the individual signal and/or broadcast signal to obtain the subframe information of the home cell (home cell CSI-RS index, CSI-RS parameter, muting resource identification information, muting interval information, muting index and home cell paging information (information of subframes multiplexed with paging), home cell broadcast information (information of subframes multiplexed with MIB or SIB)), and other-cell subframe information (paging information of another cell (information of subframes multiplexed with paging) and other-cell broadcast information (information of subframes multiplexed with MIB or SIB)).

The CSI-RS/muting information obtaining section 106 outputs the home cell CSI-RS index, CSI-RS parameter, home cell paging information, and home cell broadcast information to the home cell channel quality measuring section 108. And, the CSI-RS/muting information obtaining section 106 outputs the muting interval information, muting index, other-cell paging information, and other-cell broadcast information to another cell channel quality measuring section 109. Note that the CSI-RS/muting information obtaining section 106 outputs muting resource identification information to another cell channel quality measuring section 109 according to necessary.

The home cell channel quality measuring section 108 uses the home cell CSI-RS index, CSI-RS parameter, home cell paging information and home cell broadcast information as a basis to measure channel quality of the home cell (connected cell) and obtains a home cell CSI from the measured channel quality. In this case, as the CSI-RS is not multiplexed in the subframes multiplexed with home cell paging information or home cell broadcast information, it does not measure channel quality and measures channel quality of CSI-RS of another subframe. The home cell channel quality measuring section 108 outputs the home cell CSI information to the transmitting/receiving section 103.

Another cell channel quality measuring section 109 uses the muting interval information, muting index, other-cell paging information and other-cell broadcast information as a basis to measure channel quality of another cell, and obtains an other-cell CSI from the measured channel quality. In this case, as CSI-RS is not multiplexed in subframes multiplexed with another cell paging information or other-cell broadcast information, it does not measures channel quality but measures channel quality with use of a CSI-RS of another subframe. Another cell channel quality measuring section 109 outputs another cell CSI information to the transmitting/receiving section 103. Note that the home cell channel quality measuring section 108 and another cell channel quality measuring section 109 may be formed of the same processing section.

The transmitting/receiving section 103 transmits the home cell CSI information to the radio base station apparatus of the connected cell and transmits another cell CSI information to the radio base station apparatus of another cell.

In such a radio communication system, first, in the radio base station apparatus eNB, the notification information (broadcast signal/individual signal) containing the subframe information of the home cell and the subframe information of another cell is generated. Then, this notification information is transmitted in the broadcast signal and/or individual signal to the mobile terminal apparatus UE. In the mobile terminal apparatus UE, the notification information including the subframe information of the connected cell and the subframe information of another cell is received. Next, the channel quality of the connected cell is measured with use of the subframe information of the connected cell and the channel quality of another cell is measured with use of the subframe information of another cell. Therefore, even in consideration of the inter-cell coordination technique like CoMP, it is possible to take other-cell interference mitigation measures.

In the above-described embodiment, it is configured to improve estimation accuracy of the channel quality by adopting muting between cells. However, this configuration is by no means limiting. Muting has only to be performed between areas and, for example, muting may be performed between sectors.

The present invention is not limited to the above-described embodiment and may be embodied in various modified forms. For example, the installation position of a muting resource, the number of processing sections, the processing procedure, the number of muting resources in the above description may be modified as appropriate without departing from the scope of the present invention. Any other modifications may be added as appropriate without departing from the scope of the present invention.

The disclosure of Japanese Patent Application No. 2011-001419, filed on Jan. 6, 2011, including the specification, drawings, and abstract, is incorporated herein by reference in its entirety.

The invention claimed is:

1. A radio base station apparatus in a radio communication system supporting Coordinated Multi-point transmission/reception (CoMP), wherein:
   Channel State Information-Reference Signals (CSI-RSs) and muting are configured for a plurality of cells,
   no CSI-RS is multiplexed in a subframe in which paging or broadcast information is multiplexed, and
   information of the CSI-RSs and muting is transmitted using an RRC Connection Reconfiguration signal.

2. The radio base station apparatus according to claim 1, wherein a subframe multiplexed with the broadcast information is a subframe multiplexed with System Information Block (SIB).

3. The radio base station apparatus according to claim 1, wherein the muting is configured by such transmission power as does not cause interference to a CSI-RS in a neighbor cell.

4. A mobile terminal apparatus in a radio communication system supporting CoMP, wherein:
   CSI-RSs and muting are configured for a plurality of cells,
   no CSI-RS is multiplexed in a subframe in which paging or broadcast information is multiplexed, and
   information of the CSI-RSs and muting is received using an RRC Connection Reconfiguration signal.

5. The mobile terminal apparatus according to claim 4, wherein the mobile terminal apparatus uses the CSI-RSs to perform channel measurement on the plurality of cells.

6. A radio communication system supporting CoMP comprising:
   a radio base station apparatus, wherein
   CSI-RSs and muting are configured for a plurality of cells in the radio base station apparatus,
   no CSI-RS is multiplexed in a subframe in which paging or broadcast information is multiplexed in the radio base station apparatus, and
   the radio base station apparatus transmits information of the CSI-RSs and muting using an RRC Connection Reconfiguration signal.

7. The radio communication system according to claim 6, wherein a subframe multiplexed with the broadcast information is a subframe multiplexed with SIB.

8. The radio communication system according to claim 7, wherein the muting is configured by such transmission power as does not cause interference to a CSI-RS in a neighbor cell.

9. The radio communication system according to claim 6, wherein the muting is configured by such transmission power as does not cause interference to a CSI-RS in a neighbor cell.

* * * * *